United States Patent
Nyquist

(10) Patent No.: US 7,601,931 B2
(45) Date of Patent: Oct. 13, 2009

(54) METHOD AND APPARATUS FOR JOINING PLASTIC PIPE

(76) Inventor: Jan Nyquist, 17 Elm Street, Huntsville, Ontario (CA) P1H 1L1

( * ) Notice: Subject to any disclaimer, the term of this patent is extended or adjusted under 35 U.S.C. 154(b) by 420 days.

(21) Appl. No.: 10/545,521

(22) PCT Filed: Feb. 17, 2004

(86) PCT No.: PCT/CA2004/000214

§ 371 (c)(1),
(2), (4) Date: Aug. 15, 2005

(87) PCT Pub. No.: WO2004/074731

PCT Pub. Date: Sep. 2, 2004

(65) Prior Publication Data

US 2006/0219707 A1     Oct. 5, 2006

(30) Foreign Application Priority Data

Feb. 19, 2003 (CA) .................... 2419216

(51) Int. Cl.
*H05B 11/00* (2006.01)
*F16L 23/00* (2006.01)

(52) U.S. Cl. ..................... 219/221; 285/405
(58) Field of Classification Search .......... 219/221, 219/633; 285/405, 412, 416
See application file for complete search history.

(56) References Cited

U.S. PATENT DOCUMENTS

| 3,796,449 | A | * | 3/1974 | McLaughlin et al. | ......... 285/405 |
| 3,972,548 | A | * | 8/1976 | Roseen | ..................... 285/381.4 |
| 4,070,044 | A | * | 1/1978 | Carrow | ..................... 285/133.11 |
| 5,015,017 | A | * | 5/1991 | Geary | ..................... 285/333 |
| 5,462,706 | A | * | 10/1995 | McMillan et al. | ........... 264/138 |

FOREIGN PATENT DOCUMENTS

CA     1217116     7/1990

* cited by examiner

*Primary Examiner*—Sang Y Paik

(57) ABSTRACT

A simpler method and apparatus for joining plastic pipe (2) is provided by creating a flange ring (4) on the end of a plastic pipe (2), the flange ring (4) being cut from a short length of a larger dimension plastic pipe selected or machined to fit closely over the outer diameter of the plastic pipe (2) to provide a flange (4) which may be bolted or fastened to a similar flange. A similar method may be used to provide a connection by means of a coupling.

3 Claims, 9 Drawing Sheets

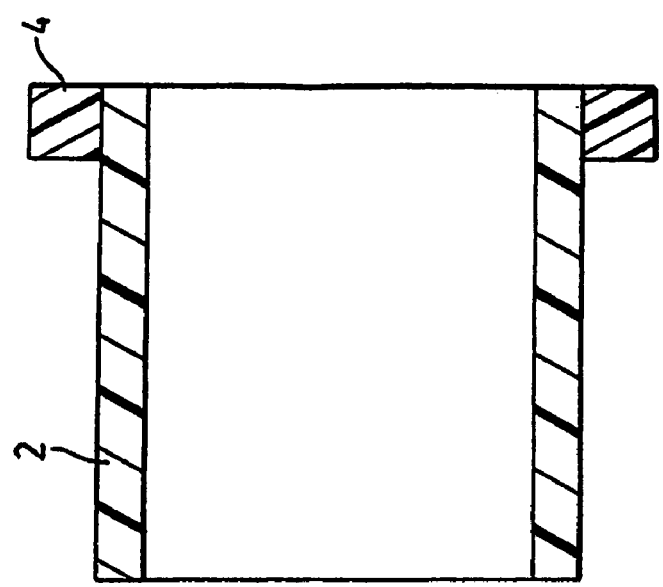
FIG. 4
FIG. 3
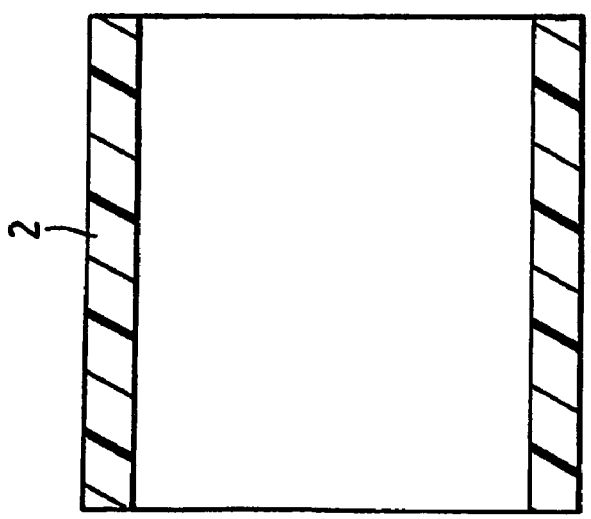

METHOD AND APPARATUS FOR JOINING PLASTIC PIPE

This invention relates to improvements in making joints for plastic pipe. In particular, it relates to an improved method for fabricating and using a means for joining lengths of plastic pipe to form a pipeline.

In many aspects of construction and fluid handling, plastic pipe has substantially replaced steel and concrete for both above ground and below ground installations.

Among the many advantages of plastic pipe is the ease by which it is fabricated (generally by extrusion into lengths of more or less 40 feet). Even at such lengths and nominal sizes of substantial diameter, such pipe is relatively light and easy to transport. It is also flexible and easier to install in difficult locations such as the relining of underground conduits.

The easy advantages of manufacture and installation tend to draw attention to the one aspect of plastic pipe which requires more care, attention, and technical know how which is the means by which lengths of plastic pipe are joined together. Traditionally, this has been done by conventional methods. One method, which is substantially confined to small diameter pipe, involves using a socket coupling into which the ends of the joining pipes can be fitted and fused or cemented. This is generally restricted to small diameter pipe and requires a special socket coupling which is specially manufactured to fit over the outer diameter of the adjoining pipe and therefore requires special manufacturing by moulding or machining techniques.

Another conventional method is known as "butt-fusion" which involves placing the adjoining ends of two lengths of pipe in close proximity, supporting them in alignment by a machine which includes axially aligned clamps, machining a smooth end on each pipe end by a rotary tool, heating the opposing ends of pipes to the melting temperature of the plastic, and then forcing the two ends of the pipe together in alignment so that the plastic is welded together by heat and pressure. This technique is difficult in that it requires machines capable of handling specific sizes of pipe, and the operation must often be performed on a job site in cold or inclement weather, and in the awkward location of a construction site. Furthermore, it requires a certain amount of skill by construction workers who are not necessarily well trained. This technique is more often used for large diameter pipes where the alternative would be to mould or machine special end fittings which are expensive.

Another method involves the use of "stub-ends". This is a fitting which is adapted to be attached to the end of a length of pipe and has a tail piece corresponding to the size of the pipe and a flange which is adapted to be bolted or otherwise fastened to a matching flange on the next adjacent pipe. These stub-ends, however, have to be moulded or machined specifically for the purpose and are therefore costly in terms of manufacturing and inventory.

U.S. Pat. No. 5,462,706 (McMillan et al) discloses forming a flange on an end of a plastic pipe liner wherein a preformed synthetic disc is heat welded to an end of the liner. The liner lines an inner surface of a steel pipe and is not a free standing pipe. The disc is not wholly cylindrical, and does not have a wholly cylindrical outer side. The disc is in the form of a stepped ring with a transition from a large diameter main portion to a smaller diameter hub that is fitted over an end of liner protruding from an end of the steel pipe. After heat welding, the hub and part of the protruding end of the liner are severed to form a finished surface coplanar with the remaining lateral face of the large diameter main portion of the disc.

It is therefore the purpose of this invention to provide a means for joining lengths of plastic pipe, usually, but not necessarily, polyethylene, which is efficient, inexpensive and efficient while providing adequate reliability and safety.

It is the additional purpose of this invention to provide a means for joining lengths of plastic pipe which does not require specifically moulded or machined connectors of the type traditionally used.

It is also the purpose of this invention to provide means for joining plastic pipe which means may be prefabricated in a factory or workshop where the working conditions, machinery, technical personnel are available to ensure a reliable product, and the ease of connecting pipes at the job site is made quicker and easier.

The invention also provides means to replace traditional manufacturing techniques to produce common end fittings such as stub-ends, flange adaptors, reducers, side wall fittings, and other products with a minimal amount of machining and less material.

These objects and other advantages are provided by the present invention by creating a flange ring on the end of a length of plastic pipe to be joined, the flange ring being created by cutting a short length of a larger dimension of plastic pipe such that the interior dimension of the ring may be chosen or machined to fit snugly over the outer dimension of the length of pipe to be joined. Identical lengths of pipe may be joined by bolts passing through holes in adjacent respective flanges of adjoining pipe lengths. Similarly, connections may be made by creating a coupling from a length of pipe in which the internal diameter is selected or machined to be the same as the external diameter of the pipes to be joined and adjacent ends of adjacent pipes may be inserted into the coupling. In most cases the flange or couplings are fused to the end of a length of pipe by heat.

The present invention may be better understood by reference to the following description of one embodiment thereof with reference to the attached drawings in which:

FIG. 3 is a longitudinal cross-section thereof showing the two parts which form the pipe joint fitting;

FIG. 4 shows the parts in FIG. 3 assembled;

Figure 2:
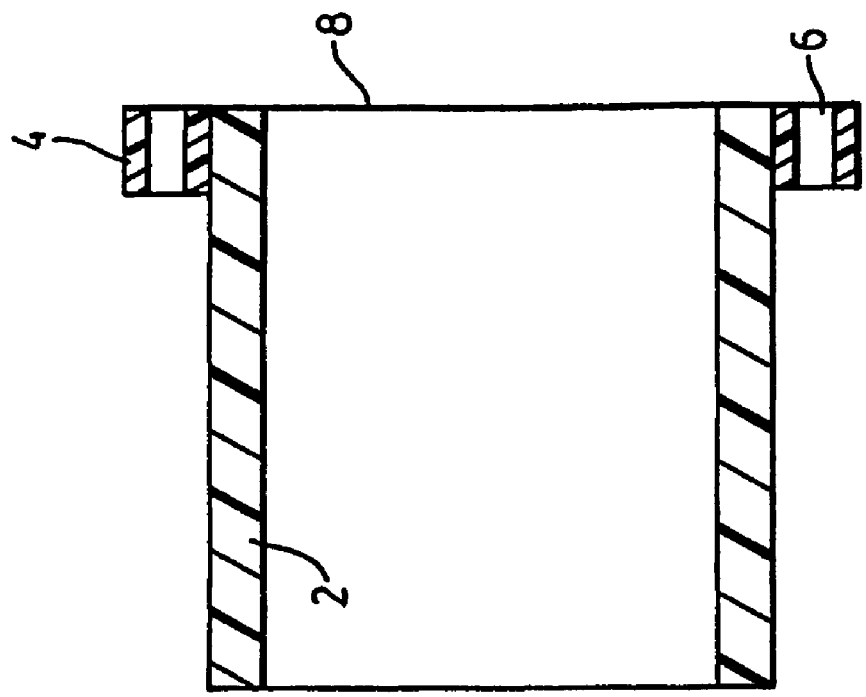
FIG. 2 is a longitudinal vertical cross-section thereof of the connection in FIG. 1.
Figure 1:
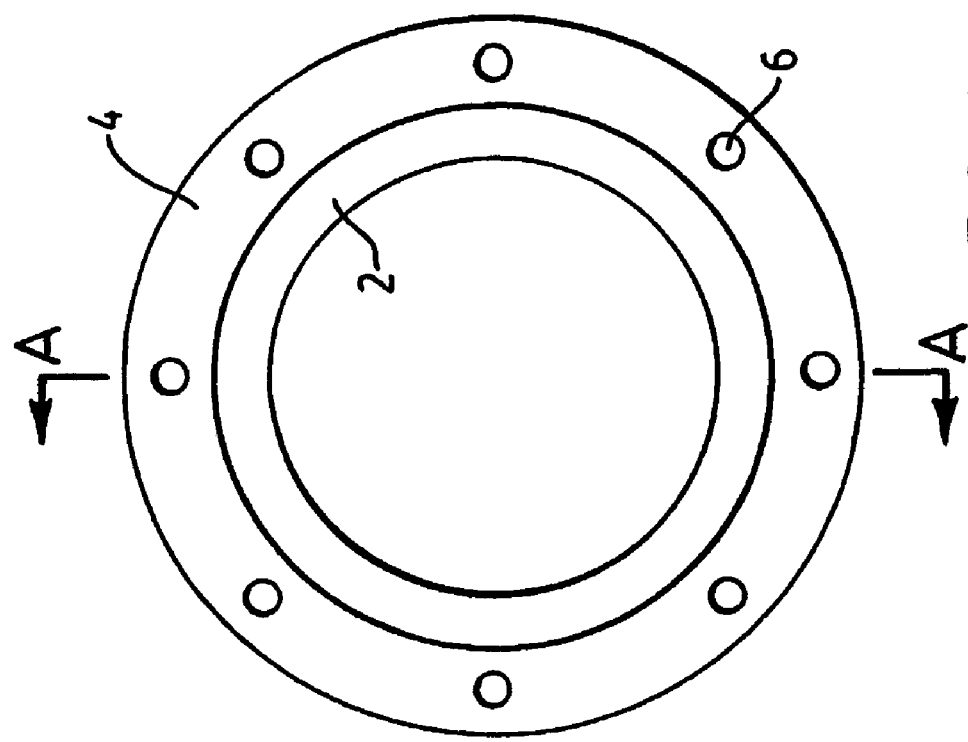
FIG. 1 is an end elevation view of a pipe connection in accordance with the present invention.

In FIGS. 1 and 2 a length of pipe 2 of nominal or conventional dimensions is shown. This may be a full length of pipe at 40 or 50 feet in length or it may be a short piece 6 inches or 1 foot long of the pipe of the same dimension as used in forming a pipeline. At one end of the piece of pipe 2 is a flange 4 comprising a surrounding ring and having bolt holes 6 extending therethrough in a longitudinal direction, parallel to the axis of the pipe.

At this point it should be appreciated that if another piece of pipe of a similar flange was placed in abutment along the common plane 8 in a mirror image orientation, the two sections could be joined together by bolts extending through the bolt holes 6 in a manner similar to the illustration in FIG. 5A referred to later.

FIG. 3 illustrates the assembly of a connector fitting in which the piece of pipe 2 is connected to the flange ring 4 (as illustrated in FIG. 4) and secured there by fusion which involves the heating of the external surface of the pipe 2 and the internal surface of the flange 4 to a temperature which allows them to fuse together when the two pieces are joined. Heating can be accomplished in a variety of ways known in the industry which include electrofusion, radiant heating, socket fusion, and hot air, etc., or the pieces may be joined by extrusion welding.

Of course, it will be realized that the bolt holes 6 may be bored before or after the assembly of the flange, but need to be aligned in adjacent connectors.

Figure 5A:
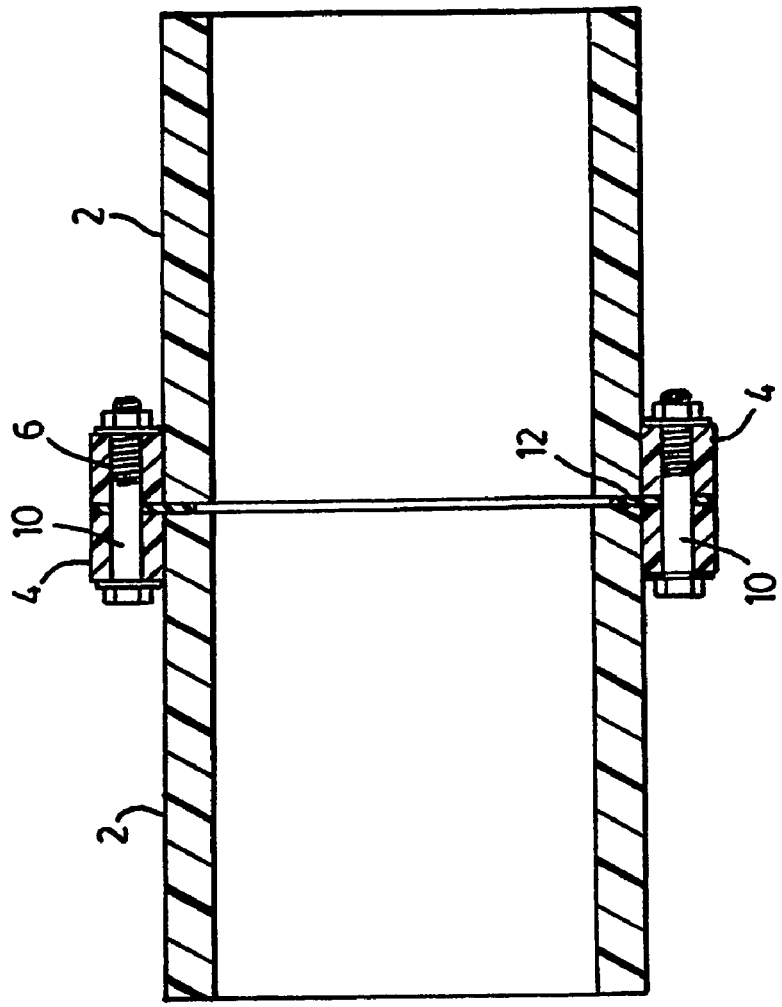
FIG. 5 is an end elevation view of a pipe connection shown in longitudinal cross-section in FIG. 5A.
Figure 5:
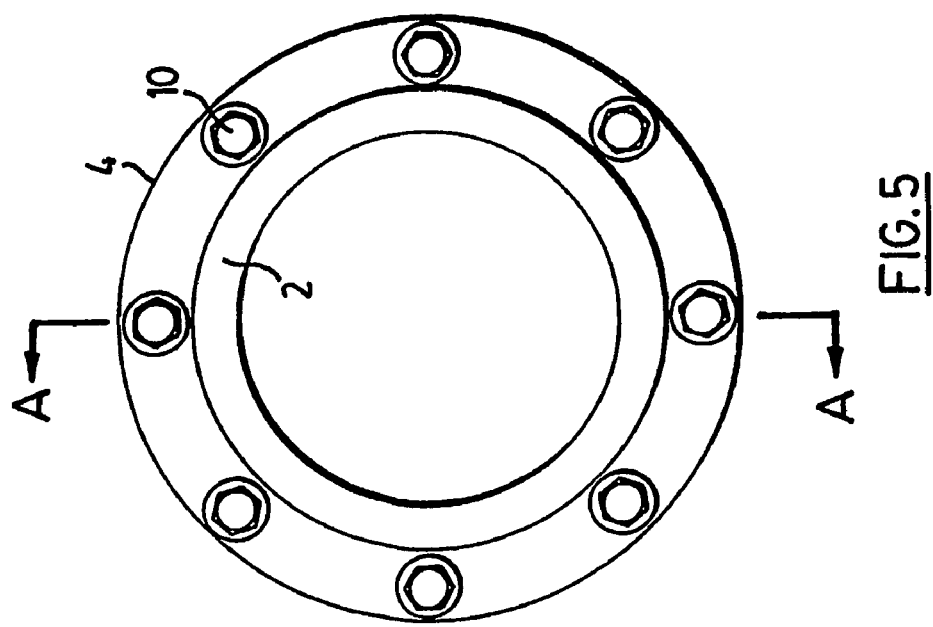
Figure 7:
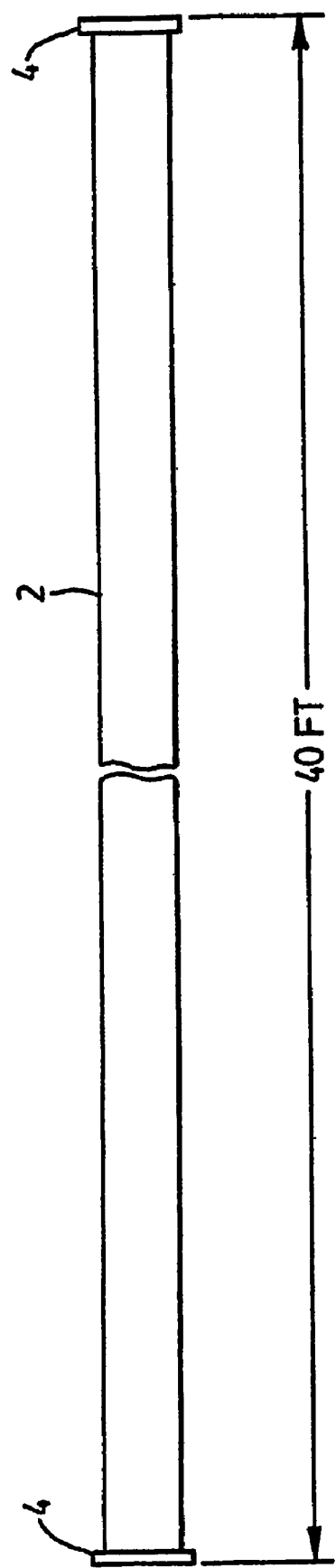
FIG. 7 is a longitudinal cross-section of a full length of pipe having joint connectors at each end in accordance with the present invention.

FIG. 5 is an end elevation view of an assembled joint connecting two pieces of pipe together as shown in longitudinal cross-section in FIG. 5A. In FIGS. 5 and 5A the two pieces of pipe 2 are joined by bolts 10 which pass the bolt holes 6 and compress the flanges together so that the ends of the pieces of pipe 2 are separated only by a gasket 12 which provides a tight seal. Once again, it should be realized that the pieces illustrated at 2 may be short pieces of pipe capable of being attached to a conventional length of polyethylene pipe in a factory, or may represent a complete length of such pipe itself, as seen in FIG. 7.

Figure 6A:
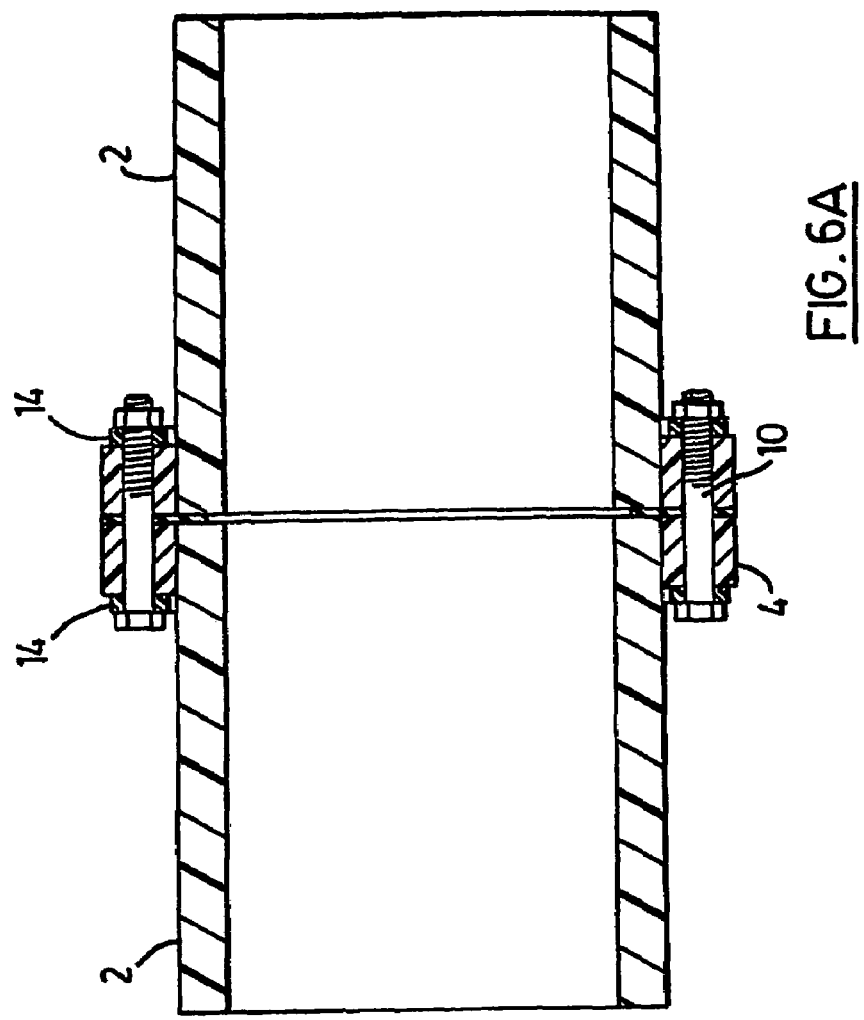
FIG. 6 is an end elevation view of a variation of the pipe connection shown in FIG. 5 with modifications as shown in cross-section in FIG. 6A.
Figure 6:
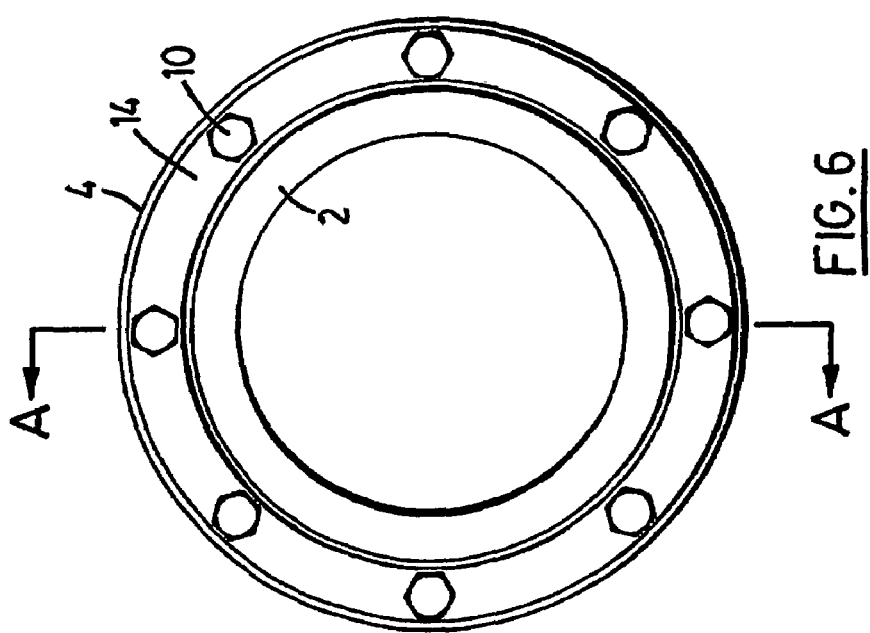

FIGS. 6 and 6A illustrated in elevation and cross section a connection to those shown in FIGS. 5 and 5A except that for strength and rigidity the flanges 4 are backed by steel rings 14 respectively on the outboard side of the connecting flanges remote from the adjacent pipe ends. This may be used whenever the mechanical strength or the pressure to be handled by pipeline and requires the joint to be more rigid.

Although flange type pipe connectors have been used in the past in both steel and plastic, these have previously involved, in the case of plastic, moulding a single piece of plastic in a shape which provides both the flange and the tail piece (such as the pipe piece 2) in a single part which must be designed specifically for the particular size and type of pipe to be connected and is therefore time consuming and expensive to manufacture and keep in stock. Alternatively, such connecting pieces are made by forming a large dimension thick wall (heavy gauge) piece of plastic which is later machined to provide a tail piece corresponding to the pipe to which it is intended to be joined and a larger portion forming the flange. This again is labour intensive and expensive, and requires a variety of ports to be kept in stock to fit various pipe diameters and gauges. These special fittings still need to be attached to respective ends of a length of standard pipe.

By means of the present invention, this process is made more efficient, cost effective and more easily performed in a workshop environment. By way of illustration, if the piece in FIG. 3 represents a full length of plastic pipe at more or less 40 feet in length and has a nominal size of 4 inches with an outer diameter (OD of 4.500 inches), the ring 4 may be fabricated by cutting a one or two inch length of six inch pipe which has an internal diameter (ID) of 4.395 inches, just slightly smaller than the OD of the 4 inch pipe. This ring can then be machined to approximately 4.500 inches ID so that it will fit snugly over the end of the 4 inch pipe length.

To secure it, the outer end surface of the pipe and the inner surface of the ring flange are heated to the melting temperature of polyethylene (or other plastic), and the pieces are fitted together to form the assembled flange end show in FIG. 4 (with or without the bolt holes).

Similarly, a length of pipe with an OD of 16 inches can be fitted with a flange ring cut from a piece of 20 inch stock with an ID of 15.289 inches prior to machining.

It will be realized that in a factory that manufactures lengths of pipe of various diameters and wall thickness, or in a supply warehouse that stocks a wide variety of plastic pipe, such compatible pieces will be relatively easy to acquire.

Furthermore, providing lengths of pipe with the appropriate connecting flanges can easily be accomplished in an indoor machine shop in which the right atmosphere, tools, and personnel are available, and the flange rings can be easily machined and assembled.

FIG. 7 illustrates a length of standard pipe fitted with the flanges described above which may be provided for a specific job or manufactured to be available in stock as needed.

No illustration of the method or machinery for machining the flange ring 4 is provided since these techniques are well known in the industry.

Figure 8:
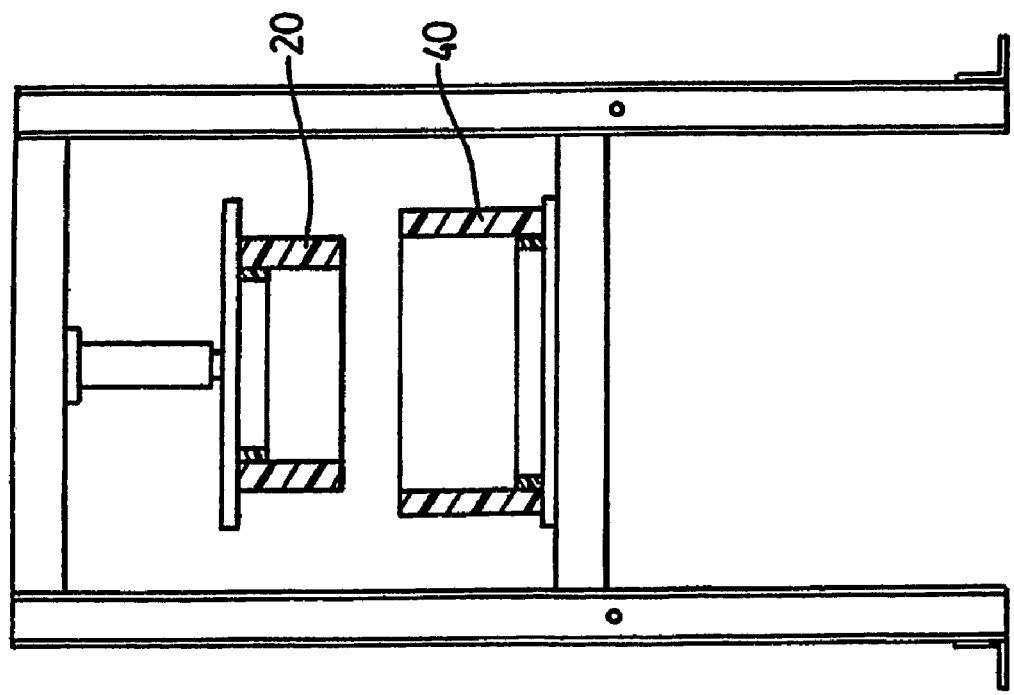
FIG. 8 shows means for assembly of two pieces of a connector fitting such as shown in FIG. 3.

FIG. 8, however, illustrates the method by which a snug fitting pipe piece 20 may be mechanically forced into the ID of a flange ring 40 under hydraulic pressure, if necessary, as it may well be in the case of vary large diameter pipe with a large wall thickness.

Figure 9:
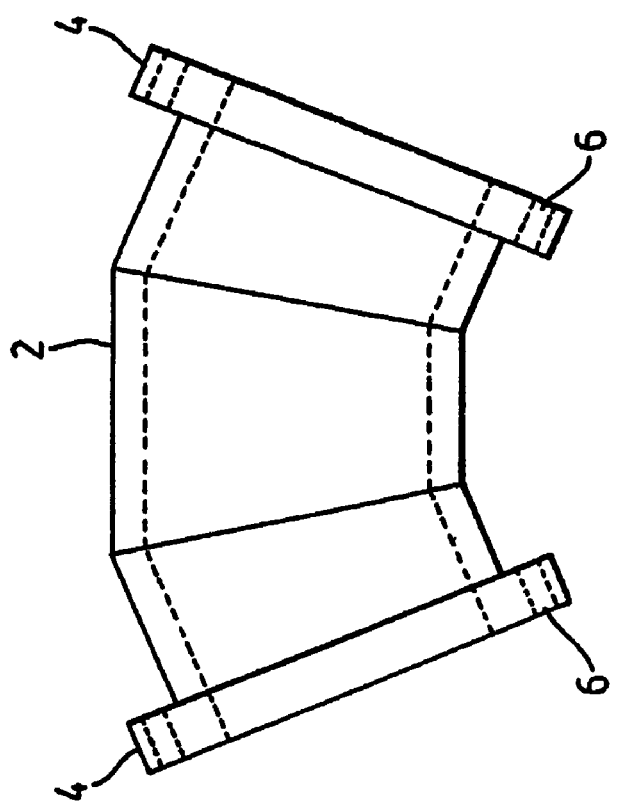
FIG. 9 shows the present invention used in an elbow fitting.

FIG. 9 illustrates how elbows and other fittings may be fabricated using the same technique.

Figure 10:
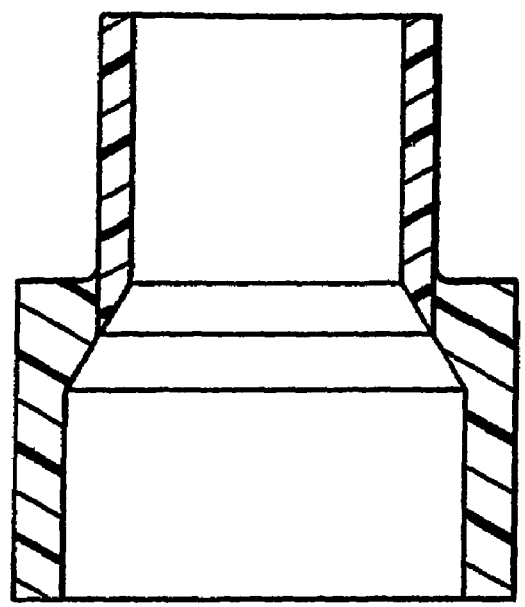
FIG. 10 shows a longitudinal section of a connection between pipes of different size to form a reducer.
Figure 10A:
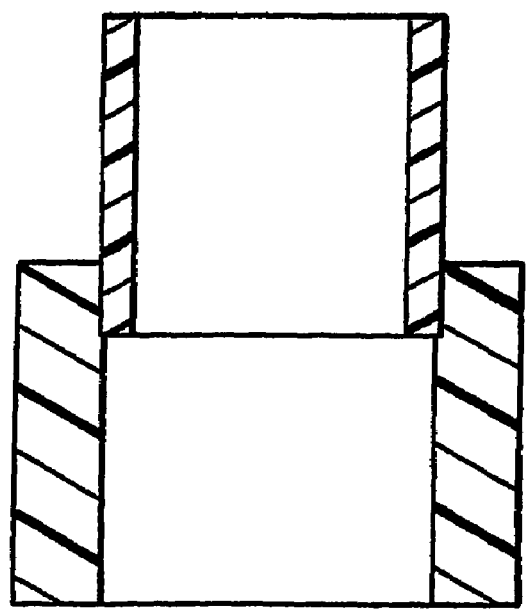
FIG. 10A shows a reducer connection machined for streamline flow.

FIG. 10 illustrates how a reducer may be formed which would serve to connect a length of 6 inch pipe to a length of 4 inch pipe using the same technique. FIG. 10A illustrates the reducer connection after machining to make the transition between the large diameter and small diameter, less abrupt and more streamlined.

It has been previously mentioned that conventional techniques for fusion of plastic pipes involve the use of machines to hold the adjacent ends in position and in alignment while a disk shaped heating element is used to heat the respective ends of the pipes to a melting temperature before they are fused together.

Figure 11:
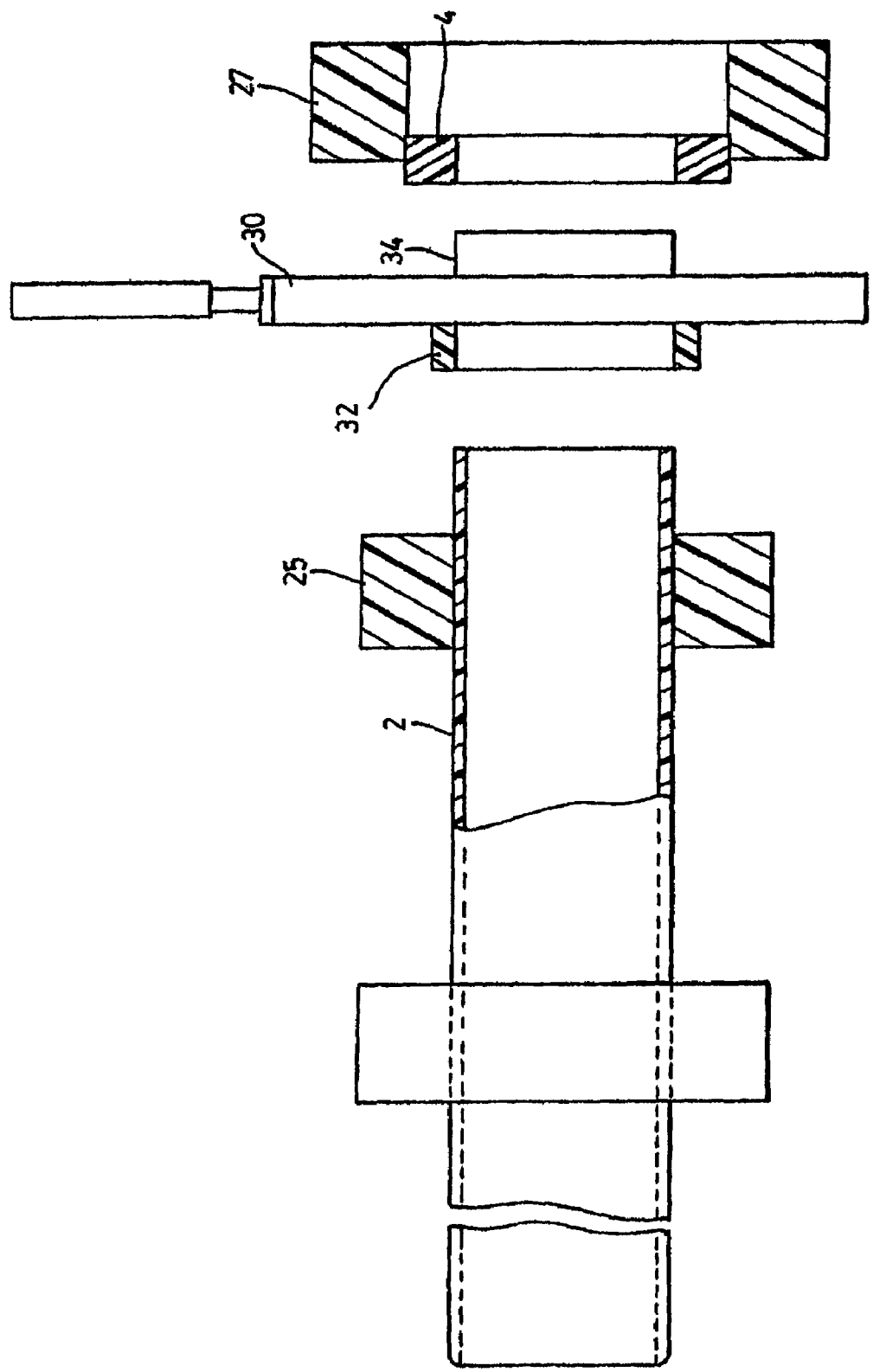
FIG. 11 illustrates the use of a heating element for fusion assembly of the pipe connectors in accordance with the present invention.

FIG. 11 illustrates the use of a heating element to assemble a connector fitting. A length of pipe 2 is held by a clamp 25 adjacent to a heating element 30, which is usually made of aluminium for its thermal conductivity properties. The heating element 30 has a raised ring 32 on one side which is sized to fit over and melt the outer surface of the end of the pipe 2. On the other side of the heating element 30 is a raised disk 34 which is sized to fit into and heat the inner surface of the flange ring 4 which is in turn held by another clamp 27. Although not illustrated, the clamps 25 and 27 are mechanically or hydraulically controlled so that they can move the pipe and the flange ring respectively into contact with the heating element and then subsequently moved apart from the heating element while the heating element is withdrawn and then the clamps are used to force the pipe and flange together into the assembled position illustrated in FIGS. 3 and 4.

Figure 12:
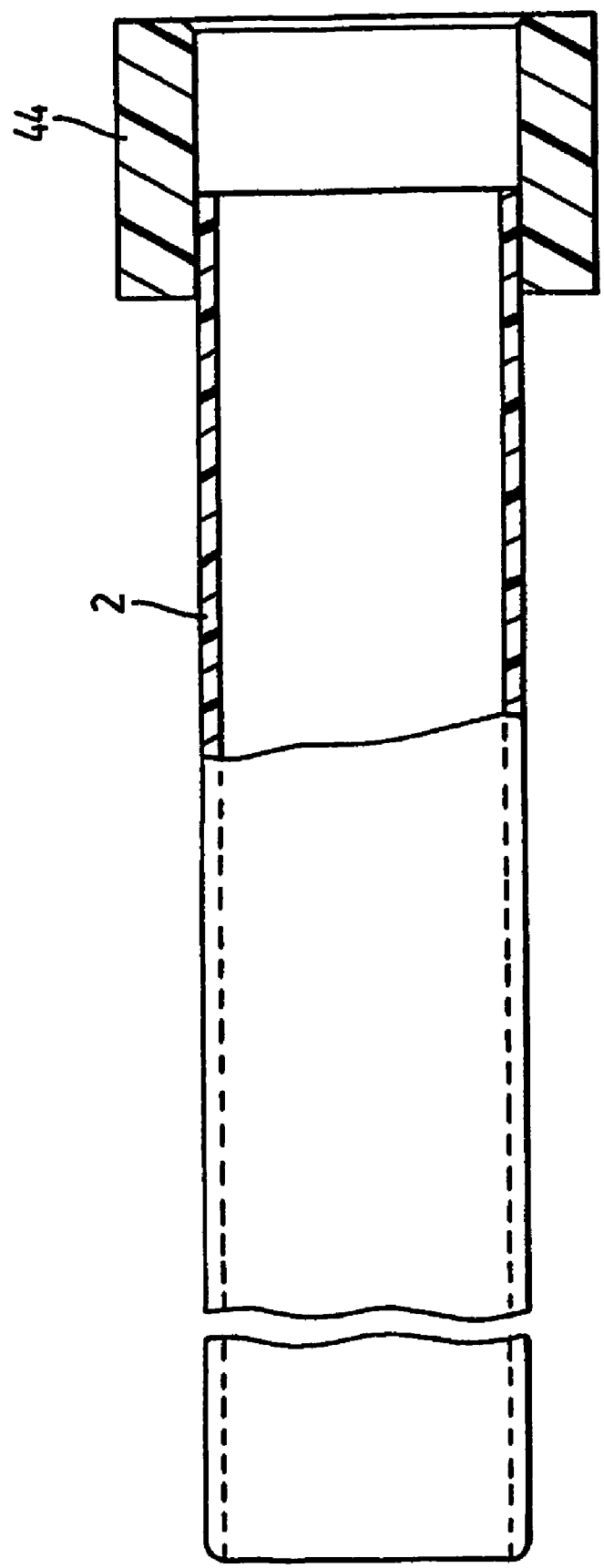
FIG. 12 illustrates the use of a heating element to assemble a modified version of the connector made in accordance with the present invention.

FIG. 12 illustrates a modified version of the assembly in FIG. 11 in which the length of pipe 2 is heated and fitted to a ring 44 of greater longitudinal dimension than the ring 4. As illustrated in FIG. 12A, pipe 2 is fused to the ring by insertion into half of the length of the ring leaving the other half available to receive the opposite end of the next adjacent pipe thereby forming a coupling where no bolts are required.

As previously mentioned, this may be done in an assembly line manner in a manufacturing or workshop facility.

It should also be realized that where the manufacture and use of plastic pipe in large volumes justifies the investment, it may be possible to design a series of standard sizes in which the OD of each nominal pipe size is substantially equal to the ID of the next largest nominal size so that the ring flanges 4 can be easily manufactured by slicing a piece of the appropriate pipe without the need for sizing or machining.

Furthermore, the reducer fitting as illustrated in FIGS. 10 and 10A may be fabricated simply by heating the ends of two compatible sizes of pipe before joining them in the illustrated manner.

It will, of course, be realized that numerous modifications and variations may be applied to the illustrated embodiments without departing from the inventive concept herein.

The invention claimed is:

1. A method of joining lengths of plastic pipe comprising: selecting a piece of pipe having an internal diameter equal to or slightly less than the outer diameter of the pipe to be joined; cutting short lengths of said piece of pipe to form rings; machining the internal diameter of said rings, if necessary, to enable said ring to fit snugly over the outer diameter of said lengths of pipe; heating the external surface of an end of each of said lengths of pipe and the internal surface of said rings to a melting temperature; fitting one of said rings over the end of each of said lengths of pipe to form a flange; and joining said lengths of pipe together by fastening adjacent flanges of adjacent pairs of said lengths of pipe together.

2. A method as claimed in claim 1 including the steps of providing holes in said flanges parallel to the longitudinal length of the pipe and passing bolts through matching holes in adjacent lengths of pipe to fasten said flanges together.

3. Method of forming a length of plastic pipe adapted to be joined to a further length of plastic pipe, comprising: providing a first length of plastic pipe having an outside diameter; selecting a second length of plastic pipe having an inner surface with an inside diameter equal to or slightly less than said inner surface to fit snuggly over said outside diameter; cutting a short length of said second length of pipe to form a ring, applying said ring as a flange on said outside diameter; and fastening said flange to said first length of pipe; and including providing said flange with a series of bolt holes extending in a direction parallel to the longitudinal axis of said first length of pipe.

* * * * *

UNITED STATES PATENT AND TRADEMARK OFFICE
CERTIFICATE OF CORRECTION

PATENT NO. : 7,601,931 B2
APPLICATION NO. : 10/545521
DATED : October 13, 2009
INVENTOR(S) : Jan Nyquist It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this

Fifth Day of October, 2010

David J. Kappos
*Director of the United States Patent and Trademark Office*